United States Patent
Wong et al.

(10) Patent No.: US 7,287,034 B2
(45) Date of Patent: Oct. 23, 2007

(54) ON-DEMAND MULTI-VERSION DATA DICTIONARY TO SUPPORT DISTRIBUTED APPLICATIONS

(75) Inventors: Lik Wong, Union City, CA (US); James William Stamos, Saratoga, CA (US); Nimar Singh Arora, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 508 days.

(21) Appl. No.: 10/431,604

(22) Filed: May 8, 2003

(65) Prior Publication Data

US 2004/0225696 A1 Nov. 11, 2004

(51) Int. Cl.
*G06F 17/30* (2006.01)
(52) U.S. Cl. ..................................... 707/101
(58) Field of Classification Search ............. 707/1–10, 707/100–104.1, 200–206
See application file for complete search history.

(56) References Cited

U.S. PATENT DOCUMENTS 5,333,303 A * 7/1994 Mohan ........................ 714/20
2004/0030707 A1* 2/2004 Lu et al. ..................... 707/100
2004/0210606 A1* 10/2004 Brown et al. ............... 707/203

OTHER PUBLICATIONS

Tadeusz Morzy et al., "On querying versions of multiversion data warehouse", ACM Press, 2004, ACM Press, NY NY, pp. 92-101.*

* cited by examiner

*Primary Examiner*—Diane D. Mizrahi
(74) *Attorney, Agent, or Firm*—Bingham McCutchen LLP (57) ABSTRACT

A method, system, and computer program product for transmitting a redo stream from a database to one or more distributed database systems, upon which applications that process the redo stream are implemented, and which maintains the data dictionaries by replicating the multiple versions of the schema objects to data dictionaries in the distributed database systems. A method of maintaining a multi-version data dictionary includes generating a logical redo stream, inserting procedure calls to be used to populate the multi-version data dictionary into the generated logical redo stream, transmitting the logical redo stream to the multi-version data dictionary, and executing the procedure calls at the multi-version data dictionary to populate the multi-version data dictionary.

32 Claims, 5 Drawing Sheets

ON-DEMAND MULTI-VERSION DATA DICTIONARY TO SUPPORT DISTRIBUTED APPLICATIONS

FIELD OF THE INVENTION

The present invention relates to a method, system, and computer program product for populating and maintaining multi-version data dictionaries (MVDDs) in distributed database systems, upon which applications may interpret a datastream using the MVDDs.

BACKGROUND OF THE INVENTION

In a typical relational database management system (RDBMS), all modifications to the database are logged in a redo stream (made up of redo records) to provide recovery and transaction durability. This redo stream (or redo log) can be used to drive asynchronous applications providing a variety of functionality. For example, the redo stream can be used to provide Logical Standby, in which a standby database shadows a primary database by extracting committed transactions out of the redo stream and applying those transactions. As another example, the redo stream can be used to provide Log-based replication, in which a replica site extracts committed changes made to the tables of interest in the database and applies the changes in order to keep the replica tables synchronized. As yet another example, the redo stream can be used to provide user query functionality, in which the redo stream is queried as though it were a relational table. In addition, the logical redo stream is platform independent and may be interpreted in any computer platform.

In one conventional application, the redo stream is analyzed to derive the equivalent data manipulation language (DML) statements that produced the redo stream. DML statements belonging to the same transaction are grouped together and committed transactions are provided to the application. Redo records typically only identify the modified schema objects or the associated columns with numbers generated internally to the database management system (DBMS). In order to perform log analysis and subsequent application of transactions, a data dictionary is needed to provide the mapping from the numbers to user-defined names. For example, SQL statements use column names and table names.

The organization of schema objects is not static. For example, columns may be dropped from or added to a table. Each new organization of a schema object defines a new version of the object. Since asynchronous log based applications may process a given portion of the redo stream multiple times and the organization of a schema object may change in the portion of the redo stream that must be reprocessed, the data dictionary required to do log analysis must represent multiple versions of the schema objects. Conventional log analysis applications could only process a given portion of the redo stream one time or would allow multiple passes over a given portion of the redo stream either by requesting that the data dictionary be completely reloaded before each pass (very expensive in terms of computing) or by accepting results that were missing some symbolic information.

In a relatively limited database system, the applications that process the redo stream are implemented in the same system as the database that generates the redo stream. However, in a more flexible distributed database system, the applications that process the redo stream are implemented in the database systems that are remote or distributed from the database that generates the redo stream. In such a distributed system, the redo stream from the database must be transmitted to one or more distributed database systems, upon which the applications that process the redo stream are implemented. In addition, in order to process the redo stream, the applications need to access a data dictionary that represents multiple versions of the schema objects. This requires the data dictionary to be maintained by replicating the multiple versions of the schema objects to data dictionaries in the distributed database systems.

A need arises for a technique by which the redo stream from the database may be transmitted to one or more distributed database systems, upon which the applications that process the redo stream are implemented, and by which the data dictionaries may be maintained by replicating the multiple versions of the schema objects to data dictionaries in the distributed database systems.

SUMMARY OF THE INVENTION

The present invention relates to a method, system, and computer program product for populating and maintaining multi-version data dictionaries (MVDDs) in distributed database systems, upon which applications may interpret a datastream using the MVDDs.

The transmitted logical redo stream is preferably greatly condensed or minimal and uses concise numbers to represent the identities of database objects. The MVDD in each distributed database system maps the numbers in the logical redo stream to database objects so that the logical redo stream can be fully translated for purposes of replication, messaging or information sharing in general. The use of a greatly condensed or minimal logical redo stream provides a number of advantages, such as compression of the information that is transmitted over the network. In addition, efficiency of production of the logical redo stream is improved, since the physical redo stream produced by databases typically uses numeric identities for objects, and it is more efficient to produce the logical redo stream with numeric identities as well. This allows delaying the overhead of converting the numeric identities to real database objects to the end consumer of the logical redo stream.

In one embodiment of the present invention, a method of maintaining a multi-version data dictionary comprises the steps of generating a logical redo stream, inserting procedure calls to be used to populate the multi-version data dictionary into the generated logical redo stream, transmitting the logical redo stream to the multi-version data dictionary, and executing the procedure calls at the multi-version data dictionary to populate the multi-version data dictionary. The step of generating a logical redo stream may comprise the steps of capturing physical redo information representing changes to a database management system from a physical redo stream and translating the captured physical redo information into logical redo information included in the logical redo stream. The logical redo information may include information representing at least a portion of the changes to the database management system represented by the physical redo information. The step of inserting procedure calls into the generated logical redo stream may comprise the step of inserting procedure calls related to an object in the database management system into the logical redo stream preceding logical redo information representing changes to the object in the redo stream. The step of inserting procedure calls into the generated logical redo stream may further comprise the step of deriving information to construct the procedure calls from a system catalog of the database management system. The step of inserting procedure calls into the generated logical redo stream may further comprise the steps of capturing a redo marker generated by an application running in the database management system and generating a procedure call based on the captured redo marker. The method may further comprise the step of applying changes to the object represented by the logical redo information in the redo stream.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention relates to a method, system, and computer program product for populating and maintaining multi-version data dictionaries (MVDDs) in distributed database systems, upon which applications may interpret a datastream using the MVDDs.

The transmitted logical redo stream is preferably greatly condensed or minimal and uses concise numbers to represent the identities of database objects. The MVDD in each distributed database system maps the numbers in the logical redo stream to database objects so that the logical redo stream can be fully translated for purposes of replication, messaging or information sharing in general. The use of a greatly condensed or minimal logical redo stream provides a number of advantages, such as compression of the information which is transmitted over the network. In addition, efficiency of production of the logical redo stream is improved, since the physical redo stream produced by databases typically uses numeric identities for objects, and it is more efficient to produce the logical redo stream with numeric identities as well. This allows delaying the overhead of converting the numeric identities to real database objects to the end consumer of the logical redo stream.

Figure 1:
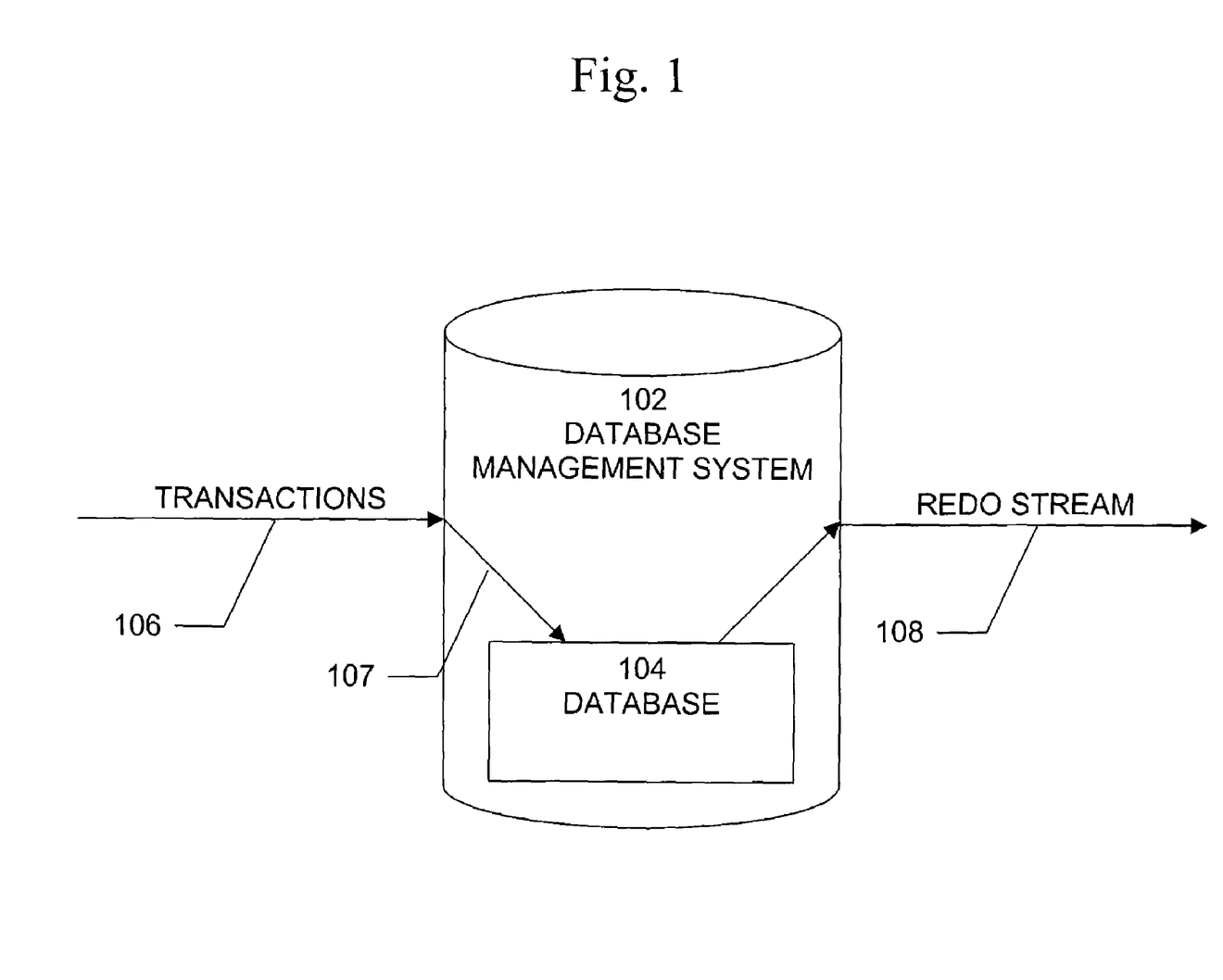
FIG. 1 is an exemplary block diagram of a database management system in which the present invention may be implemented.

An exemplary database management system (DBMS) 102, in which the present invention may be implemented, is shown in FIG. 1. Database management system (DBMS) 102 provides the capability to store, organize, modify, and extract information from one or more databases included in DBMS 102. From a technical standpoint, DBMSs can differ widely. The terms relational, network, flat, and hierarchical all refer to the way a DBMS organizes information internally. The internal organization can affect how quickly and flexibly you can extract information.

Each database included in DBMS 102 includes a collection of information organized in such a way that computer software can select and retrieve desired pieces of data. Traditional databases are organized by fields, records, and files. A field is a single piece of information; a record is one complete set of fields; and a file is a collection of records. An alternative concept in database design is known as Hypertext. In a Hypertext database, any object, whether it be a piece of text, a picture, or a film, can be linked to any other object. Hypertext databases are particularly useful for organizing large amounts of disparate information, but they are not designed for numerical analysis.

Typically, a database includes not only data, but also low-level database management functions, which perform accesses to the database and store or retrieve data from the database. Such functions are often termed queries and are performed by using a database query language, such as Structured Query Language (SQL). SQL is a standardized query language for requesting information from a database. Historically, SQL has been a popular query language for database management systems running on minicomputers and mainframes. Increasingly, however, SQL is being supported by personal computer database systems because it supports distributed databases (databases that are spread out over several computer systems). This enables several users on a local-area network to access the same database simultaneously.

Most full-scale database systems are relational database systems. Small database systems, however, use other designs that provide less flexibility in processing queries. Relational databases are powerful because they require few assumptions about how data is related or how it will be extracted from the database. As a result, the same database can be viewed in many different ways. An important feature of relational systems is that a single database can be spread across several tables. This differs from flat-file databases, in which each database is self-contained in a single table.

DBMS 102 may also include one or more database applications, which are software that implements a particular set of functions that utilize one or more databases. Examples of database applications include:

- computerized library systems
- automated teller machines
- flight reservation systems
- computerized parts inventory systems Typically, a database application includes data entry functions and data reporting functions. Data entry functions provide the capability to enter data into a database. Data entry may be performed manually, by data entry personnel, automatically, by data entry processing software that receives data from connected sources of data, or by a combination of manual and automated data entry techniques. Data reporting functions provide the capability to select and retrieve data from a database and to process and format that data for other uses. Typically, retrieved data is used to display information to a user, but retrieved data may also be used for other functions, such as account settlement, automated ordering, numerical machine control, etc.

DBMS 102 includes one or more databases, such as database 104. Database 104 includes one or more data tables. One or more streams of transactions, such as transaction stream 106, are input to DBMS 102. A transaction is any database operation that may result in a change to database 104 or to the data stored in database 104. Each transaction includes one or more Data Manipulation Language (DML) and/or Data Definition Language (DDL) statements 107. DML statements are used to store, retrieve, modify, and erase data from database 104. DDL statements are used to define the structure and instances of a database.

The performance of the DML statements 107 making up each transaction results in changes being made to the data stored in database 104. These changes are used to generate redo stream 108, which may be output from DBMS 102. Redo stream 108 includes a plurality of redo records, in which each redo record specifies one or more changes that were made to the database or to the data stored in the database.

Preferably, redo stream 108 is formatted as a logical redo stream for transmission to other distributed database systems. A physical redo stream is typically is the most efficient format for generating and storing redo information used by the database taking the machine architecture and operating system into account. A logical redo stream is a translation of the physical redo stream into a format which is portable to any machine architecture or operating system. The use of a greatly condensed or minimal logical redo stream provides a number of advantages, such as compression of the information which is transmitted over the network. In addition, efficiency of production of the logical redo stream is improved, since the physical redo stream produced by databases typically uses numeric identities for objects, and it is more efficient to produce the logical redo stream with numeric identities as well. This allows delaying the overhead of converting the numeric identities to real database objects to the end consumer of the logical redo stream.

Transaction stream 106 includes a plurality of transactions, which include commands and/or statements that cause the performance of database operations that may result in a change to database 104 or to the data stored in database 104. The commands and/or statements included in transaction stream 106 may be DML statements, or they may be higher-level commands, such as Application Program Interface (API) calls. Where transaction stream 106 includes API calls, these calls typically are converted to DML statements 107, in order for the transactions to be performed. Where transaction stream 106 includes DML statements, in some embodiments, the DML statements may be performed directly, while in other embodiments, the DML statements may be converted to lower-level DML statements, which are then performed. For example, in some embodiments, transaction stream 106 may include DML statements, such as SQL statements, the SQL statements may be performed directly. In other embodiments, transaction stream 106 may include DML statements, such as SQL statements, but the SQL statements are converted to lower-level DML statements, which are then performed.

Typically, the redo records included in redo stream 108 are processed to reconstruct the equivalent DML statement that produced them. DML statements belonging to the same transaction are grouped together and committed transactions are returned to the application. Since redo records identify the database objects affected by the transactions by internally generated numbers, in order to perform log analysis and subsequent application of transactions, a data dictionary is needed to provide the mapping between the internally generated numbers and the corresponding user defined names. For example, Structured Query Language (SQL) statements use column names and table names that typically have meaning to a person, while the internal database schema identifies the corresponding columns and tables with internally generated numbers.

Figure 2:
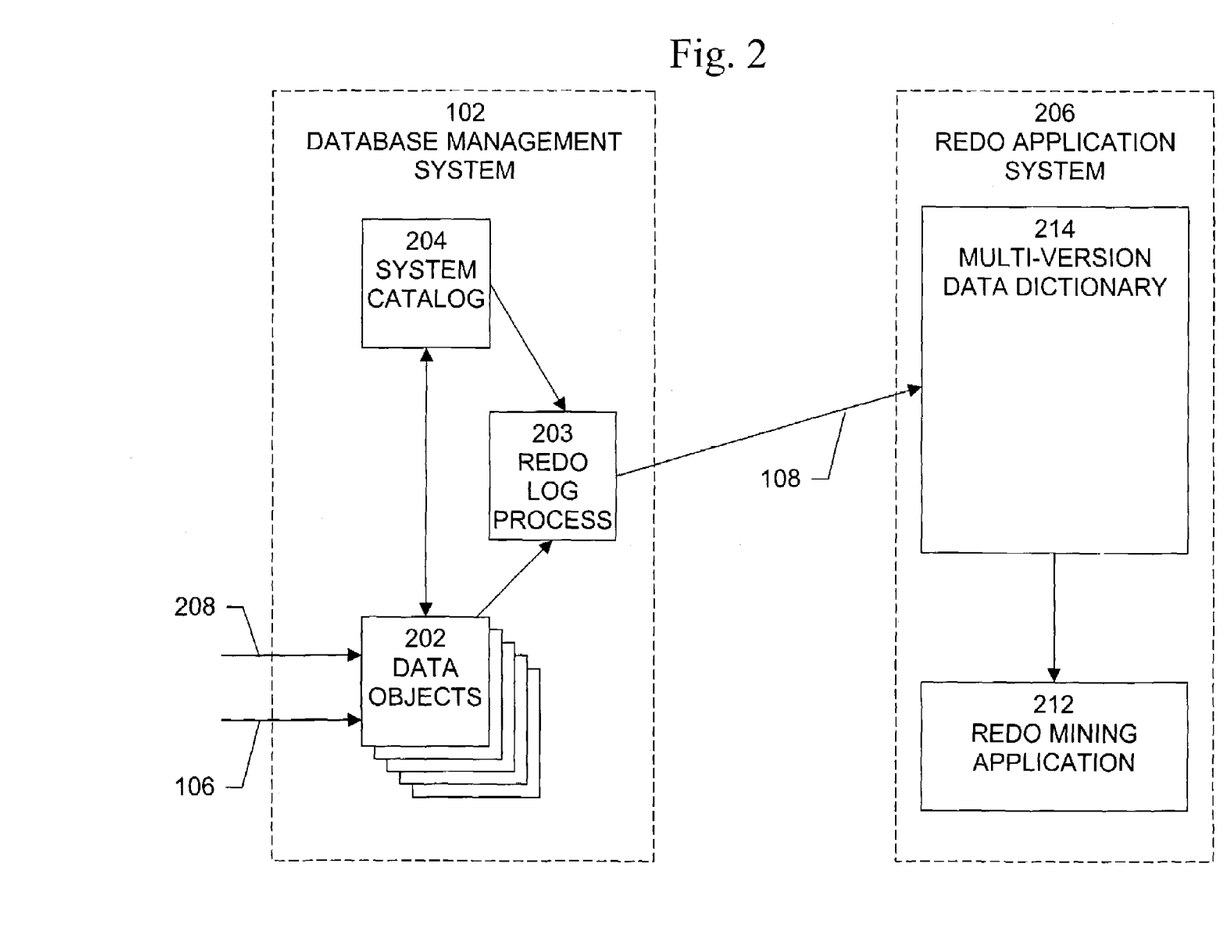
FIG. 2 is an exemplary data flow diagram and data structure format of redo mining processing, according to the present invention.

An exemplary data flow and data structure of redo mining is shown in FIG. 2. Database management system (DBMS) 102 includes a plurality of data objects 202, such as data tables that store data, and system catalog 204, which stores a description of the data objects 202. Data objects 202 are typically stored in an internal format in DBMS 102, and are identified by internally generated identifiers, such as identification numbers. These internally generated identifiers provide efficient access to and processing of the data objects 202 by DBMS 102, but they are not optimal for use by the users of DBMS 102. System catalog 204 includes associations between the internally generated identifiers and object identifiers, such as user-defined names for the objects, which are more useful to the users of DBMS 102.

As shown in FIG. 1, transactions 106 are performed by DBMS 102. Transactions 106 cause changes to be made to the data stored in data objects 202. These changes are captured by redo log process 203, packaged into redo stream 108 and transmitted to redo application system 206. In addition, changes 208 are made to data objects 202 themselves, and these changes are reflected in system catalog 204. Typically, these changes are structural changes that may be made to data objects 202. For example, data tables may be created or deleted, within data tables columns may be created or deleted, tables or columns may be renamed, etc. The initial state of system catalog 204 and changes reflected in system catalog 204 are also transmitted to redo application system 206, preferably as data definition language transactions. Typically, the DDL transactions are captured by redo log process 203, packaged into redo stream 108, and transmitted to redo application system 206.

Redo application system 206 includes redo mining application 212 and/or other redo stream consumer and multi-version data dictionary (MVDD) 214. Redo mining application 212 processes redo stream 108 to provide functionality such as logical standby, log-based replication, query functionality, etc. MVDD 214 is designed to record the changes made to the underlying objects and use version numbers associated with these objects to identify the correct object being referenced in the minimal logical redo stream, since the numeric identities assigned to the objects are not static. Data in MVDD 214 may be stored in any suitable format. For example, the data may be stored in a normalized format or in a denormalized format. The normalized format is similar to the format in which the information is stored in system catalog 204. In the normalized format, a set of relational database tables is used to store the information. In the denormalized format, the information for each system catalog that is stored in the tables of the normalized format is stored in a single flattened (non-relational) data table.

It is important to note that since asynchronous log based applications may process a given portion of the redo stream multiple times, such applications may read a given portion of the MVDD multiple times. The capability to support such multiple reads of the MVDD is important in order to support restartability of the applications.

In addition to the table-related dictionaries described above, an MVDD generically may be used for managing multiple versions of the entire data dictionary. Thus, an MVDD may include not only table related dictionaries, but also other dictionaries, such as including information relating to procedures, data types, and database level information. Examples of such information include:

a). An object number indicating an object that may represent the owner of a package, the package name, and the procedure name. Parameter position may be used to represent the parameter name inside a procedure. The object version number may be used to record the specification and implementation of a package or procedure at a particular point in time. Whenever the specification or implementation of the package or procedure is changed, such as adding a new procedure or adding a new parameter to an existing procedure, the object version number is incremented.

b). An object number indicating an object that may store the data type owner and data type name for a user-defined data type. The object version number may be used to record the specification and implementation of a data type at a particular point in time. Whenever the shape or implementation of the data type is changed, such as adding a new attribute or adding a new member method, the object version number is incremented.

c). Database level information, such as character set, the operating system running the database, etc., may also be stored in the MVDD. Whenever the database level information is changed, such as the character set or the operating system, the database version number is incremented.

As shown in FIG. 2, MVDD 214 is logically separate from DBMS 102. In some applications, such as where MVDD 214 is used to support log-based applications, such as redo mining application 212, the MVDD 214, and possibly the applications are implemented on the same computer system as the process that generates the redo stream.

However, MVDD 214 may also be implemented in one or more downstream databases, such as downstream DB 206. A downstream database is a database that reads the redo stream of a source database. A distributed environment consists of a set of such databases connected by a network.

Figure 3:
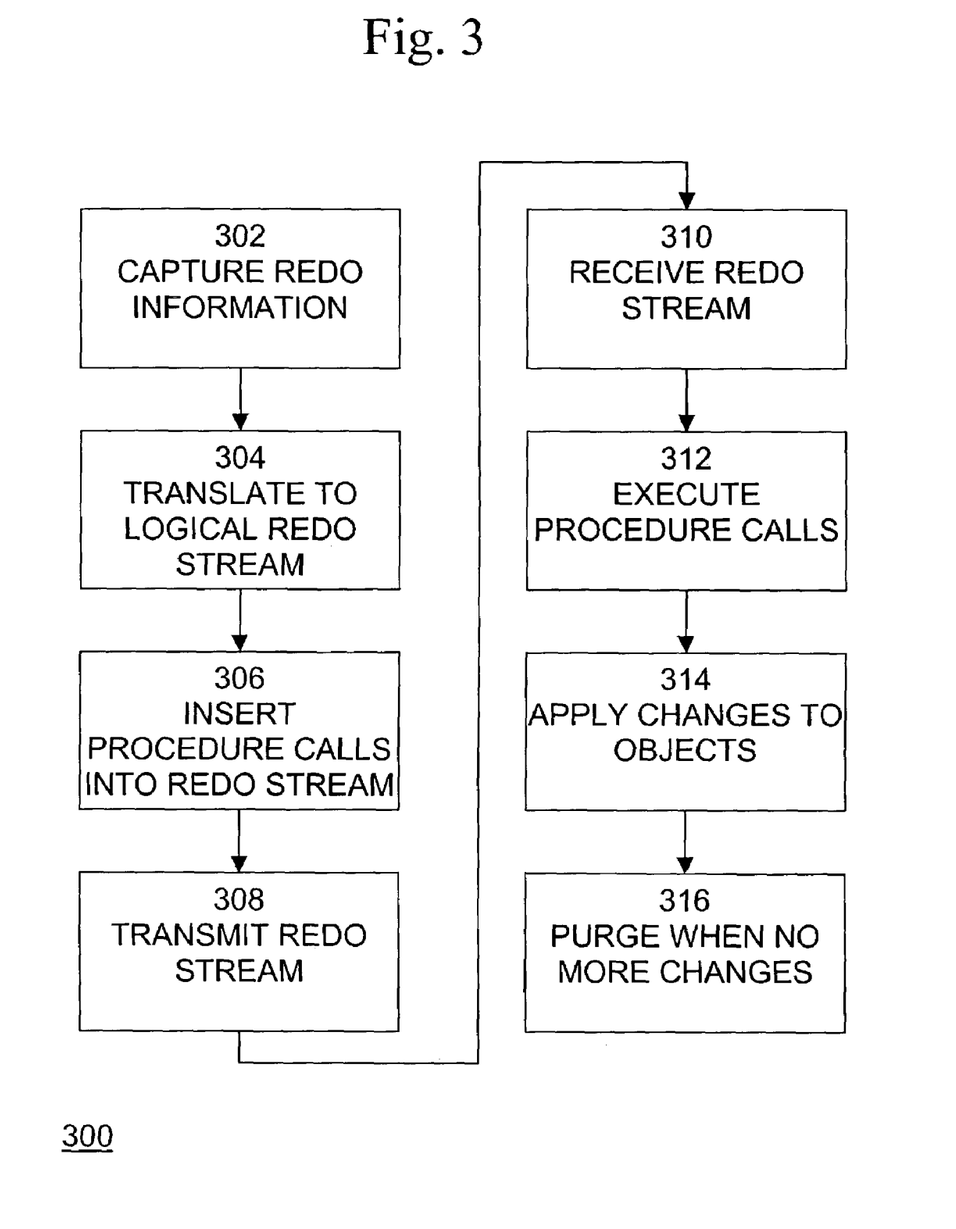
FIG. 3 is an exemplary flow diagram of a process of maintaining distributed multi-version data dictionaries, according to the present invention.

An exemplary flow diagram of a process 300 of maintaining distributed MVDDs is shown in FIG. 3. It is best viewed in conjunction with FIG. 2. The process begins with step 302, in which redo log process 203 captures redo information representing changes performed to DBMS 102. The redo changes captured by redo log process 203 may not be assembled into transactions when delivered from the mining database. Instead, in step 304, the physical redo stream, which is a sequence of raw data from the changes made, is translated into a logical redo stream, such as redo stream 108. In logical redo stream 108, the operation and exact values are represented in a logical or other format.

However, some object information, such as object number and internal column numbers to represent object owner, object name and column names are still present in logical redo stream 108 for a compact and efficient representation. Logical redo stream 108 may include all changes that were present in the physical redo stream, or it may represent a subset of the changes in the physical redo stream.

To allow logical redo stream 108 to flow from DBMS 102 to downstream databases, such at redo application system 206, the downstream MVDDs, such as MVDD 214, must be populated in the downstream databases. Typically, procedure calls are used to populate a downstream MVDD. In step 306, the procedure calls for an object are inserted into logical redo stream 108 by redo log process 203 before any changes for the object that are in logical redo stream 108. Necessary dictionary information to construct the procedure calls are derived from the system catalog 204 in DBMS 102.

It is important to note that the execution of the procedure calls is idempotent—procedure calls for the same object at different versions can be executed out of order. That is, a procedure call with an earlier version for an object can be executed after a procedure call with a later version has already been executed for this object.

MVDD 214 is maintained by idempotent procedure calls which are injected into the logical redo stream by the physical redo capture process. The importance of idempotence is that the procedure calls may be re-applied due to replay resulting as a consequence of recovering from unreliable transmission protocols. To achieve idempotence it is critical that the numeric identities assigned to objects are not re-used. However, it is allowed to reuse the numeric identities of an object when the version number of the encapsulating object increases.

For example, tables are encapsulating objects for columns. Each column gets its own number, but when columns are dropped and added a column number can be reused only if the version of the table increases.

It follows that when the version of an object is increased, the information regarding all encapsulated objects must be resent. For example, when the version number of a table increases, the information regarding the column number to column name mapping for all the columns in the table must be resent.

Applications running in DBMS 102 can trigger the generation of the procedure calls for an object on demand by dropping redo markers. When the redo marker is captured by redo log process 203, procedure calls for the relevant object can be injected into the logical redo stream 108. Alternatively, the procedure calls for an object can be dynamically injected by redo log process 203 into logical redo stream 108 immediately preceding the changes for the object that are injected into the logical redo stream 108. Upon DDL changes, procedure calls for the new version of an object are injected into the logical redo stream 108. The DDL changes themselves may or may not be part of the logical redo stream.

In step 308, logical redo stream 108, including the procedure calls and the changes for the objects, is transmitted from DBMS 102 to one or more downstream database systems, such as redo application system 206. In step 310, the downstream database system, such as redo application system 206, receives the transmitted logical redo stream 108. In step 312, the procedure calls for populating an MVDD, such as MVDD 214, are executed immediately when the procedure calls are received by the downstream database system, such as redo application system 206. Since procedure calls for an object precede the changes for the object, this ensures that log-based applications in the downstream database can access and interpret the changes to the object. In step 314, the changes for the objects are applied to MVDD 214.

Downstream MVDDs from different source databases may be uniquely identified by the name of the source database, or some other unique naming scheme known in the distributed environment. Procedure calls for an object are identified by a version number and can be sent to and executed at different releases of downstream databases. Two downstream databases may consume different subsets of a logical redo stream. Procedure calls for an object are only sent to a downstream database if the changes for the object will be sent to the downstream database. In step 316, the downstream MVDD for an object can be safely purged when there are and will be no more changes for the object staged in the downstream database.

Figure 4:
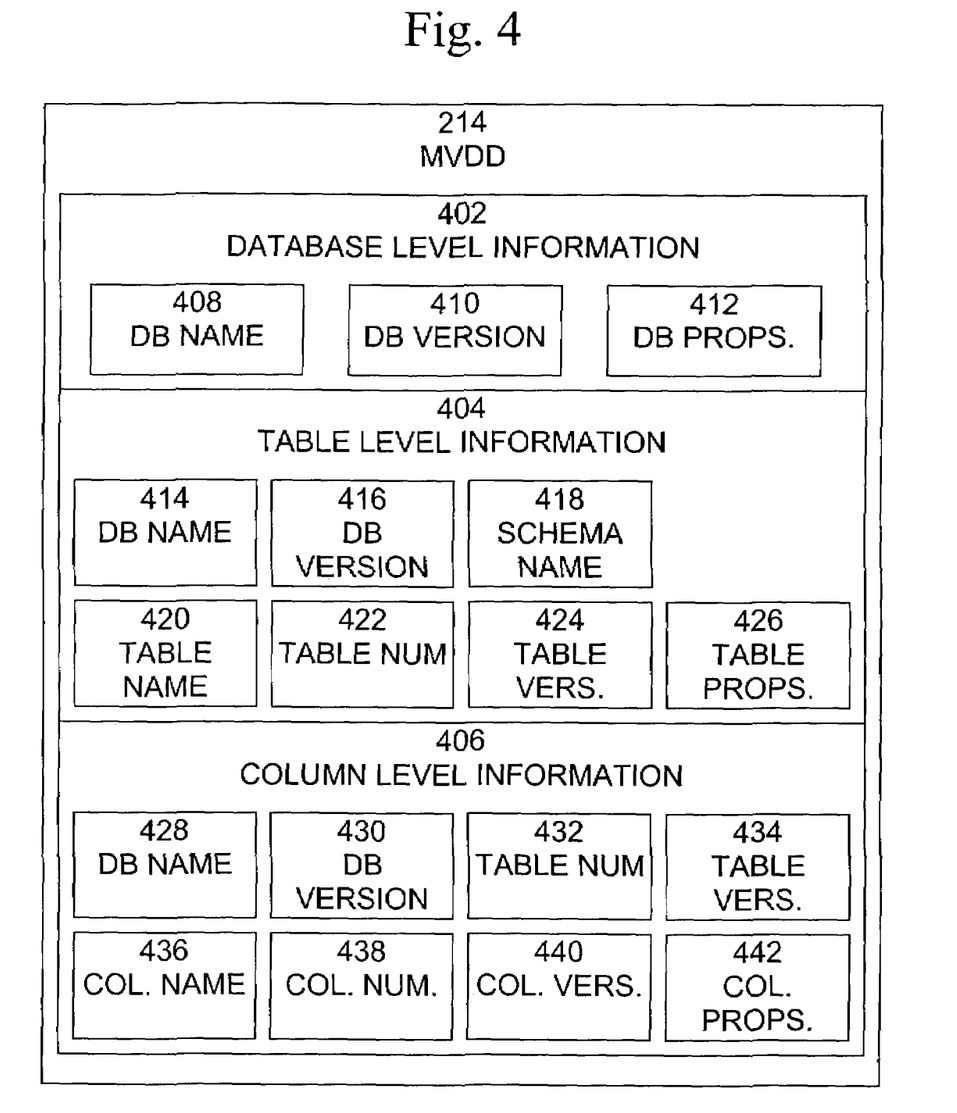
FIG. 4 is an exemplary format of a denormalized history table shown in FIG. 2.

An example of information stored in MVDD 214 is shown in FIG. 4. MVDD 214 includes several levels of information, such as database level information 402, table level information 404, and column level information 406. Database level information 402 includes information such as database name 408, database version 410, and database properties 412. Table level information includes information such as database name 414 (of the database to which the table belongs), database version 416, schema name 418, table name 420, table number 422, table version 424, and table properties 426. Column level information includes information such as database name 428 (of the database of the table to which the column belongs), database version 430, table number 432 (of the table to which the column belongs), table version 434, column name 436, column number 438, column version 440, and column properties 442. Typically, database properties 412, table properties 426, and column properties 442 are complex data structures determined by the database implementation.

The procedures for maintaining the MVDD have names, such as add_database, add_table, and add_column, have the same parameters as the columns of the corresponding table.

Database version 410, 416, and 430 is increased when the tables in the database are re-numbered, such as when the database is re-built using export/import. Database properties 412 normally do not change except when the database is rebuilt, in which case the database version 410, 416, and 430 is increased. Table version 424 and 434 is increased when a column is added to or deleted from the table and when table properties 426 are modified. Column version 440 is increased when column properties 442 are modified.

Whenever an object's version is increased, information about all the encapsulated objects must be repopulated. For example, when table version 424 and 434 is increased, the add_table procedure for the table and the add_column procedures for each of the columns of the table must be transmitted in the logical redo stream to repopulate MVDD 214 with the new versions of the table and columns.

The hierarchy of information shown in FIG. 4 is not limited to the exemplary database/table/column hierarchy shown. Similar information hierarchies are used for all objects in the database, with the database at the top of the hierarchy. For example, information hierarchies such as database/sequence, database/package/procedure, database/type/sub-type, etc., may be used.

Each table operation LCR may include information such as database name, database version, table number, table version, logical operation, and an array of column values, where each column value may include column number, column version, and column data. The column data is to be interpreted in the context of the properties of the column and the encapsulating table and database. For a very simple example: the column properties might indicate that a column contains numeric data, the database properties might indicate that the database stores all numeric data in little-endian format. This is sufficient information to allow the column data to be interpreted on any machine.

Consider an example of an MVDD, such as that shown in FIG. 4. In this example:

Database level:
dbname, dbversion, dbproperties
ORACLEWORLD, 1, (numbers are little endian, strings are Latin-1, etc.)

Table level:
dbname, dbversion, schemaname, tablename, tabnum, tabversion, tabproperties =ORACLEWORLD, 1, SCOTT, EMP, 1, 1, (table is relational, etc.)

Column level:
dbname, dbversion, tabnum, tabversion, colname, colnum, colversion, colproperties =
ORACLEWORLD, 1, 1, 1, id, 1, 1, (type is numeric, etc.)
ORACLEWORLD, 1, 1, 1, name, 2, 1, (type is string, etc.)
. . .

Initial procedure calls, such as the following, would be sent to define the above MVDD.

add_database(ORACLEWORLD, 1, (numbers are little endian, strings are Latin-1, etc.)),
add_table(ORACLEWORLD, 1, SCOTT, EMP, 1, 1, (table is relational, etc.)),
add_column(ORACLEWORLD, 1, 1, 1, id, 1, 1, (type is numeric, etc.)),
add_column(ORACLEWORLD, 1, 1, 1, name, 2, 1, (type is string, etc.)).
. . .

If a new column "dept" is added, the column numbering would change as follows:
dept=1,
id=2,
name=3.

The following MVDD procedure calls would be sent to update the MVDD:
add_table(ORACLEWORLD, 1, SCOTT.EMP, 1, 2, (table is relational, etc.)),
add_column(ORACLEWORLD, 1, 1, 2, dept, 1, 1, (type is string, etc.)),
add_column(ORACLEWORLD, 1, 1, 2, id, 2, 1, (type is numeric, etc.)),
add_column(ORACLEWORLD, 1, 1, 2, name, 3, 1, (type is string, etc.)).

Note that the version number of the table SCOTT.EMP has increased. A logical redo on SCOTT.EMP with version 1 and column number 1 would refer to the id column while a logical redo on the same table with version 2 and the same column number would refer to the dept column. The MVDD helps in correctly interpreting the numbers in the logical redo.

Figure 5:
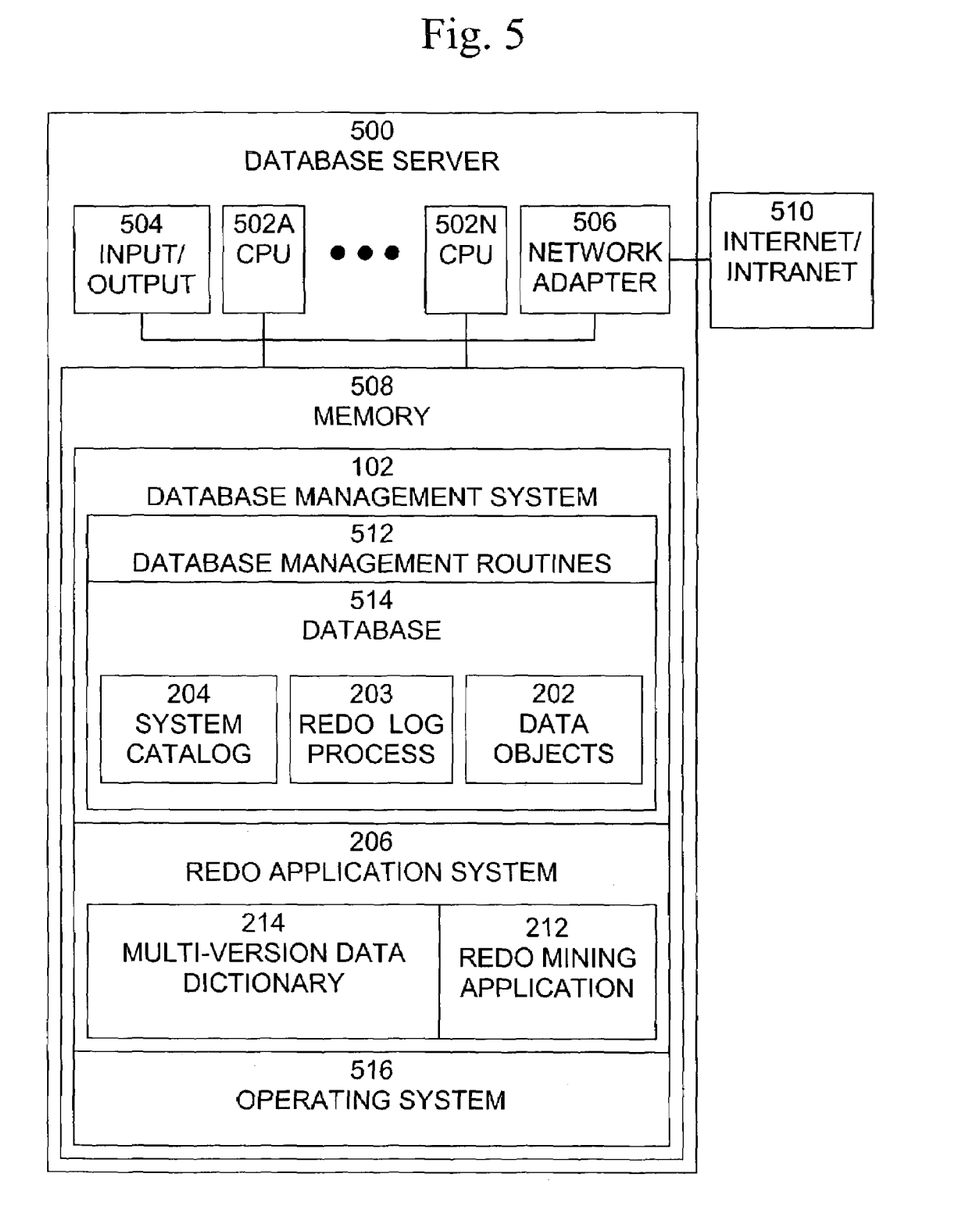
FIG. 5 is an exemplary block diagram of a database server in which the present invention may be implemented.

An exemplary block diagram of a database server (DBMS) 500 is shown in FIG. 5. Server 500 is typically a programmed general-purpose computer system, such as a personal computer, workstation, server system, and minicomputer or mainframe computer. Server 500 includes one or more processors (CPUs) 502A–502N, input/output circuitry 504, network adapter 506, and memory 508. CPUs 502A–502N execute program instructions in order to carry out the functions of the present invention. Typically, CPUs 502A–502N are one or more microprocessors, such as an INTEL PENTIUM® processor. FIG. 5 illustrates an embodiment in which server 500 is implemented as a single multi-processor computer system, in which multiple processors 502A–502N share system resources, such as memory 508, input/output circuitry 504, and network adapter 506. However, the present invention also contemplates embodiments in which server 500 is implemented as a plurality of networked computer systems, which may be single-processor computer systems, multi-processor computer systems, or a mix thereof.

Input/output circuitry 504 provides the capability to input data to, or output data from, server 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces server 500 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of server 500. Memory 508 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

The contents of memory 508 varies depending upon the function that system 500 is programmed to perform. For example, database server 500 may implement DBMS 102, or database server 500 may implement a downstream database system, such as redo application system 206. Although both DBMS 102 and redo application system are shown in memory 508, memory 508 may only include one or the other. However, one of skill in the art would recognize that these functions, along with the memory contents related to those functions, may be included on one system, or may be distributed among a plurality of systems, based on well-known engineering considerations. The present invention contemplates any and all such arrangements.

In the example shown in FIG. 5, memory 508 includes database management system 102, and/or redo application system 206, and operating system 516. Although in this example, database management system 102 and redo application system 206 are both shown included in database server 500, one of skill in the art would recognize that these systems may be implemented together or separately without based on factors such as cost and performance. It is to be noted that the present invention contemplates and all such implementations.

Database management system (DBMS) 102 provides the capability to store, organize, modify, and extract information from one or more databases included in DBMS 102. Database management system (DBMS) 102 includes a plurality of data objects 202, such as data tables that store data, system catalog 204, which stores a description of the data objects 202, and redo log process 203, which captures redo information from changes made to data objects 202 and system catalog 204. Data objects 202 are typically stored in an internal format in DBMS 102, and are identified by internally generated identifiers, such as identification numbers. These internally generated identifiers provide efficient access to and processing of the data objects 202 by DBMS 102, but they are not optimal for use by the users of DBMS 102. System catalog 204 includes associations between the internally generated identifiers and object identifiers, such as user-defined names for the objects, which are more useful to the users of DBMS 102.

Redo application system 206 includes redo mining application 212 and MVDD 214. Redo mining application 212 processes redo stream 108 to provide functionality such as logical standby, log-based replication, query functionality, etc.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and WINDOWS®, are capable of running many tasks at the same time and are called multitasking operating systems. Multitasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of maintaining a multi-version data dictionary in a computerized database system comprising a processor operable to execute computer program instructions, a memory operable to store computer program instructions executable by the processor, and computer program instructions stored in the memory and executable to perform the method comprising the steps of:

transforming information relating to modifications made to the database to form a logical redo stream;

inserting procedure calls to be used to populate the multi-version data dictionary into the logical redo stream;

transmitting the logical redo stream to the multi-version data dictionary; and executing the procedure calls at the multi-version data dictionary to populate the multi-version data dictionary.

2. The method of claim 1, wherein transforming step comprises the steps of:

capturing physical redo information representing changes to a database management system from a physical redo stream; and translating the captured physical redo information into logical redo information included in the logical redo stream.

3. The method of claim 2, wherein the logical redo information includes information representing at least a portion of the changes to the database management system represented by the physical redo information.

4. The method of claim 2, wherein the step of inserting procedure calls into the logical redo stream comprises the step of:
inserting procedure calls related to an object in the database management system into the logical redo stream preceding logical redo information representing changes to the object in the redo stream.

5. The method of claim 4, wherein the step of inserting procedure calls into the logical redo stream further comprises the step of:
deriving information to construct the procedure calls from a system catalog of the database management system.

6. The method of claim 5, wherein the step of inserting procedure calls into the logical redo stream further comprises the steps of:
capturing a redo marker created by an application running in the database management system; and
transforming the captured redo marker to form a procedure call.

7. The method of claim 4, further comprising the step of:
applying changes to the object represented by the logical redo information in the redo stream.

8. A computer-implemented system for maintaining a multi-version data dictionary in a computerized database system comprising:
a processor operable to execute computer program instructions;
a memory operable to store computer program instructions executable by the processor; and
computer program instructions stored in the memory and executable to cause the database system to:
transform information relating to modifications made to the database to form a logical redo stream;
insert procedure calls to be used to populate the multi-version data dictionary into the logical redo stream;
transmit the logical redo stream to the multi-version data dictionary; and
execute the procedure calls at the multi-version data dictionary to populate the multi-version data dictionary.

9. The system of claim 8, wherein the transforming step comprises the steps of:
capturing physical redo information representing changes to a database management system from a physical redo stream; and
translating the captured physical redo information into logical redo information included in the logical redo stream.

10. The system of claim 9, wherein the logical redo information includes information representing at least a portion of the changes to the database management system represented by the physical redo information.

11. The system of claim 9, wherein the step of inserting procedure calls into the logical redo stream comprises the step of:
inserting procedure calls related to an object in the database management system into the logical redo stream preceding logical redo information related to the object in the redo stream.

12. The system of claim 11, wherein the step of inserting procedure calls into the logical redo stream further comprises the step of:
deriving information to construct the procedure calls from a system catalog of the database management system.

13. The system of claim 12, wherein the step of inserting procedure calls into the logical redo stream further comprises the steps of:
capturing a redo marker created by an application running in the database management system; and
transforming the captured redo marker to form a procedure call.

14. The system of claim 11, further comprising the step of:
applying changes to the object represented by the logical redo information in the redo stream.

15. A computer program product including a computer readable storage medium including a tangible computer readable storage medium and computer program instructions, recorded on the computer readable medium, executable by a processor, for maintaining a multi-version data dictionary in a computerized database system comprising:
transforming information relating to modifications made to the database to form a logical redo stream;
inserting procedure calls to be used to populate the multi-version data dictionary into the logical redo stream;
transmitting the logical redo stream to the multi-version data dictionary; and
executing the procedure calls as the multi-version data dictionary to populate the multi-version data dictionary.

16. The computer program product of claim 15, wherein the information is transformed by:
capturing physical redo information representing changes to a database management system from a physical redo stream; and
translating the captured physical redo information into logical redo information included in the logical redo stream.

17. The computer program product of claim 16, wherein the logical redo information includes information representing at least a portion of the changes to the database management system represented by the physical redo information.

18. The computer program product of claim 16, wherein the procedure calls are inserted into the logical redo stream by:
inserting procedure calls related to an object in the database management system into the logical redo stream preceding logical redo information related to the object in the redo stream.

19. The computer program product of claim 18, wherein the procedure calls are further inserted into the logical redo stream by:
deriving information to construct the procedure calls from a system catalog of the database management system.

20. The computer program product of claim 19, wherein the procedure calls are further inserted into the logical redo stream by:
capturing a redo marker created by an application running in the database management system; and
transforming the captured redo marker to form a procedure call.

21. The computer program product of claim 18, further comprising the step of:
applying changes to the object represented by the logical redo information in the redo stream.

22. A computer-implemented method of maintaining a multi-version data dictionary in a computerized database system comprising the steps of:
transforming information relating to modifications made to the database to form a logical redo stream by capturing physical redo information representing changes to a database management system from a physical redo stream and translating the captured physical redo information into logical redo information included in the logical redo stream;

inserting procedure calls to be used to populate the multi-version data dictionary into the logical redo stream; and transmitting the logical redo stream to the multi-version data dictionary.

23. The method of claim 22, wherein the logical redo information includes information representing at least a portion of the changes to the database management system represented by the physical redo information.

24. The method of claim 22, wherein the step of inserting procedure calls into the logical redo stream comprises the step of:

inserting procedure calls related to an object in the database management system into the redo stream preceding logical redo information representing changes to the object in the redo system.

25. The method of claim 24, wherein the step of inserting procedure calls into the logical redo stream further comprises the step of:

deriving information to construct the procedure calls from a system catalog of the database management system.

26. The method of claim 25, wherein the step of inserting procedure calls into the logical redo stream further comprises the steps of:

capturing a redo marker created by an application running in the database management system; and transforming the captured redo marker to form a procedure call.

27. A computer-implemented method of maintaining a multi-version data dictionary in a computerized database system comprising the steps of:

receiving at a multi-version data dictionary a logical redo stream comprising procedure calls to be used to populate the multi-version data dictionary, wherein the logical redo stream further comprises logical redo information created by capturing physical redo information representing changes to a database management system from a physical redo stream and translating the captured physical redo information into logical redo information included in the logical redo stream;

executing the procedure calls at the multi-version data dictionary to populate the multi-version data dictionary.

28. The method of claim 27, wherein the logical redo information comprises information representing at least a portion of the changes to the database management system represented by the physical redo information.

29. The method of claim 27, wherein the logical redo stream further comprises procedure calls related to an object in the database management system preceding logical redo information representing changes to the object in the redo stream.

30. The method of claim 29, wherein the procedure calls are based on information from a system catalog of the database management system.

31. The method of claim 30, wherein the procedure calls are formed by transforming a captured redo marker created by an application running in the database management system.

32. The method of claim 29, further comprising the step of:

applying changes to the object represented by the logical redo information in the redo stream.

* * * * *